2,754,304

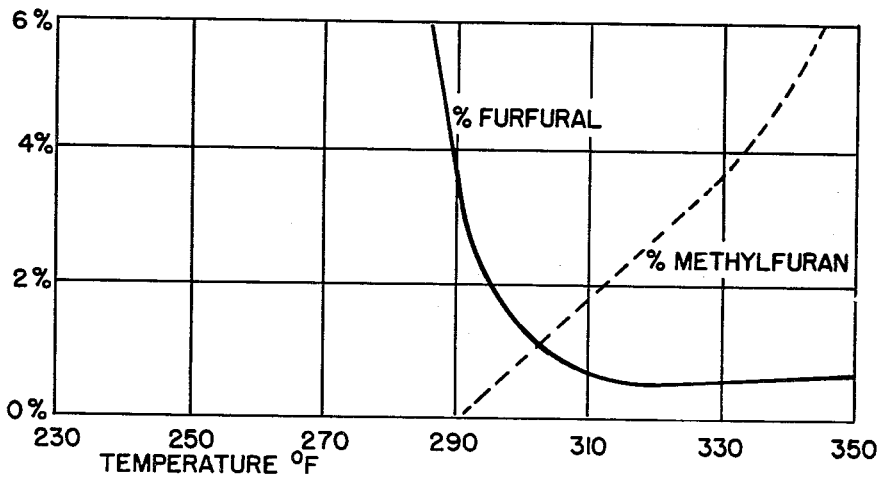
FIG. 1 RELATION OF TEMPERATURE TO AMOUNT OF IMPURITIES IN FURFURYL ALCOHOL PRODUCED OVER A COPPER CATALYST.
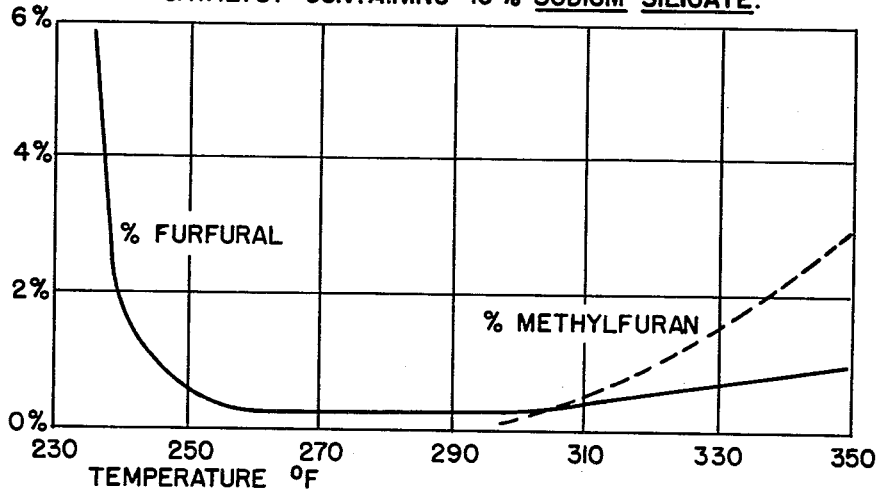
FIG. 2 RELATION OF TEMPERATURE TO AMOUNT OF IMPURITIES IN FURFURYL ALCOHOL PRODUCED OVER A COPPER CATALYST CONTAINING 10% SODIUM SILICATE.
INVENTOR:
SAMUEL SWADESH
BY: FLOYD TRIMBLE
AGENT United States Patent Office 2,754,304
Patented July 10, 1956

CATALYTIC PRODUCTION OF FURFURYL ALCOHOL AND CATALYST THEREFOR

Samuel Swadesh, Mill Valley, Calif., assignor to The Quaker Oats Company, Chicago, Ill., a corporation of New Jersey Application May 27, 1952, Serial No. 290,350

5 Claims. (Cl. 260—347.8)

The present invention relates to an improved process for producing furfuryl alcohol from furfural, and the catalyst used therefor. More specifically it relates to a continuous process of producing furfuryl alcohol by treating furfural while in the vapor phase and under atmospheric pressure with gaseous hydrogen in contact with a specially prepared catalyst. The present application is a continuation-in-part of my copending application Serial No. 86,540, filed April 9, 1949 now abandoned.

Heretofore, commercial catalytic processes for the production of furfuryl alcohol from furfural have involved either liquid or vapor phase hydrogenation, most of which have been carried out under high pressure, necessitating specially designed equipment which is expensive and heavy. In addition to the foregoing disadvantage, which is common to high pressure liquid and vapor phase hydrogenation processes, there are certain disadvantages peculiar to each. For example, numerous metals, such as copper, nickel, platinum, palladium, and oxides of platinum have been proposed as catalysts for the vapor phase reduction of furfural. In all such cases the hydrogenation products have been a complex mixture. Specifically, if furfural is reduced by the prior art vapor phase methods, furfuryl alcohol in limited quantities is first produced; however, the reaction does not stop at that point but may proceed as far as the formation of normal amyl alcohol. In addition to the low yield of the desired product, control of those processes has been difficult. Good yields of furfuryl alcohol have been obtained by the hydrogenation of furfural in the liquid phase under elevated pressures, but the operating costs have been high due to the fact that they are batch processes and filtration is necessary for the final separation of catalyst and product. In addition to the high pressure processes employed for the reduction of furfural, Ricard and Guinot in United States Patent 1,739,919 describe a process for the vapor phase reduction of furfural at atmospheric pressure. This process, however, produces a mixture consisting of furfuryl alcohol with a considerable quantity of methylfuran and unchanged furfural; in fact, the process may be so operated as to produce practically only methylfuran.

An object of the present invention is to provide a new and improved process for the production of furfuryl alcohol which method obviates the disadvantages of the prior art reduction procedures. Another object of the invention is a method whereby furfuryl alcohol may be prepared in substantially quantitative yields by the reduction of furfural. Still another object of this invention is the production of furfuryl alcohol from furfural more economically than heretofore. Still another object of the invention is an improved process whereby furfuryl alcohol can be produced in substantially quantitative yields throughout a wide temperature range. Yet another object of the invention is the production of furfuryl alcohol of high quality from technical furfural by a process which is capable of operating continuously over comparatively long periods of time. A further object is a special catalyst comprising metallic copper in admixture with sodium silicate as a promoter and regulator. A further object is the method of making such a particularly suitable catalyst. A further object of this invention is the utilization of low cost, low pressure hydrogen.

Other objects and advantages of the invention will be hereinafter pointed out or will be apparent to those skilled in the art after a further description of the invention is made.

In the accompanying drawings,

Fig. 1 shows a chart illustrating the effects of a copper catalyst, and

Fig. 2 shows a chart illustrating the effects of a copper catalyst in admixture with 10% by weight of sodium silicate.

I have discovered that furfuryl alcohol may be prepared in substantially quantitative yields by the partial reduction of furfural, while in the vapor phase, with a catalyst comprising finely divided copper and a sodium silicate. In accordance with one aspect of the present invention, furfural is vaporized, mixed with an excess of hydrogen gas and then passed over the catalyst, which latter is brought to the proper temperature by suitable heating means. Even when technical furfural is used in the preferred embodiment of my process, the furfuryl alcohol so produced is water-white in color and is suitable for practically all purposes without further refining.

In order to disclose the nature of the present invention still more clearly, the following illustrative examples will be given. It is to be understood that the invention is not to be limited to the specific conditions or details set forth in these examples except in so far as such limitations are specified in the appended claims. Parts given are parts by weight.

EXAMPLE 1

*Preparation of catalyst*

Six parts of powdered technical grade cupric oxide is triturated with four parts of a 40° Baumé aqueous solution of sodium silicate (water glass). This is of the type known as "N" and has a $Na_2O$ to $SiO_2$ ratio of 1:3.22; and contains 8.9% $Na_2O$ and 28.7% of $SiO_2$, the total solids content being 37.6%. The resulting black pasty mass is dried in an oven at about 78° C. for approximately 20 hours and then pulverized. After adding 0.1 part of flake graphite to the resulting powder as a mold lubricant, the mixture is compressed into cylindrical briquettes roughly ⅛ by ⅛ inch. This produces the desired catalyst base, which contains approximately 80% of CuO and 20% of anhydrous sodium silicate. This, however, still requires activation or reduction to form the actual catalyst. To accomplish this the curpric oxide-sodium silicate mixture is decomposed by heating it at a temperature of 150°–400° C. while hydrogen or a mixture of hydrogen and nitrogen is passed over it until the copper oxide has been reduced to metallic copper. The catalyst thus made is composed of reduced copper and anhydrous sodium silicate. The temperature of activation is dependent upon the composition of the gas used in the activation step; the greater the hydrogen content, the lower the allowable temperature, as, for instance, temperatures as low as 150° C. are suitable when the composition of the gas is 100% hydrogen. If on the other hand the gaseous mixture consists of 5% hydrogen and 95% nitrogen a temperature of 300°–400° C. is required. Temperatures exceeding 400° C. should be avoided because of the danger of sintering the reduced copper.

Many modifications of the foregoing method will be apparent to those skilled in the art without departing from the spirit of the invention, as, for instance, any copper compound which will form cupric or cuprous oxide upon ignition may be calcined and then the resulting cupric or cuprous oxide treated as in Example 1.

Similar catalysts were prepared, using six parts of CuO and, respectively, three, two and one parts of the same kind of sodium silicate. These were considered as roughly containing 15%, 10% and 5% of sodium silicate. It will be seen that by taking the actual solids content of the "N" brand sodium silicate, these actually contained about 15.8%, 11.1% and 5.9% of anhydrous sodium silicate. In the drawing and in subsequent tables herein, these are described as containing 15%, 10% and 5% of the silicate.

EXAMPLE II

Reduction of furfural

Furfural is vaporized at a rate of 50 parts per hour, continuously mixed with a quantity of hydrogen greatly in excess of that theoretically needed to reduce all the furfural to furfuryl alcohol, and the resulting mixture is then passed through a converter containing the catalyst, which is preferably maintained at a temperature of from about 120° to about 155° C. From the converter the vapors pass through a condenser where the hydrogenation products, consisting of furfuryl alcohol, a small amount of unchanged furfural together with traces of water and methylfuran, are condensed and removed from the system. Since a large excess of hydrogen is used, the excess hydrogen should be recycled for efficient operation. This may be accomplished by mixing the hydrogen which is to be recycled with furfural vapors and again passing the resulting mixture through the converter.

This process has been operated continuously over a long period and the condensate so obtained was water-white in color and its furfuryl alcohol content greater than 99%.

Furfuryl alcohol may be produced using merely the theoretical amount of hydrogen necessary to reduce all the furfural to furfuryl alcohol, but I prefer to use a large excess, because by the latter procedure a water-white product is obtained, while with the former a colored product results. The amount of hydrogen necessary to accomplish this result is dependent upon the temperature, being inversely related thereto. The exact mechanics of this phenomena are not known, but a theory which explains the facts is as follows: If all the furfural is maintained in the vapor phase, no polymerization occurs and a water-white product is obtained; however, if the furfural is allowed to exist in the liquid phase in the catalyst tube, polymerization occurs, whereby a colored product is produced. Therefore, sufficient hydrogen should be used so as to maintain the furfural in the vapor phase. Consequently a larger amount of hydrogen is required at low temperatures to maintain a vapor phase than at higher temperatures.

While an operating temperature, in the catalyst chamber, of 120° to 155° C. is preferred, temperatures outside of this range may be used. For example, a temperature as low as 80° C. may be employed if means are provided to insure sufficient contact time between the catalyst and the vapors. Also, a temperature of 200° C. may be used provided a sufficiently short contact time is employed.

In order to demonstrate conclusively the advantages of a reduced copper catalyst containing sodium silicate with one which does not, a series of experiments were run, using an equal volume of catalyst in each experiment. These experiments are summarized in Tables I, II, III, and IV below. The data in Table I were obtained by using a copper catalyst alone and that of Tables II, III, and IV by using copper catalysts containing, respectively, 5%, 10% and 20% of sodium silicate, calculated on the basis of CuO before reduction by hydrogen.

To the best of my knowledge there are no accurate analytical methods for the quantitative determination of furfuryl alcohol, consequently the actual furfuryl alcohol content in the product has not been given in the tables. It can be closely approximated, however, by subtracting the sum of unchanged furfural and methylfuran from 100%, after establishing the fact that furfuryl alcohol is present by a determination of the specific gravity, refractive index, boiling point and solubility in water of the product.

Table I shows the results of four test runs, A, B, C, and D, wherein the temperature was varied from 143° to 177° C., but using a copper catalyst without sodium silicate. This is for purposes of comparison.

TABLE I.—COPPER ALONE

| Run | Temp., °C. | Furfural feed, parts/hour | Product Analysis | |
|---|---|---|---|---|
| | | | Furfural, percent | Methylfuran, percent |
| A | 143 | 18 | 3.82 | 0.0 |
| B | 154 | 18 | 0.40 | 2.0 |
| C | 166 | 22 | 0.70 | 5.6 |
| D | 177 | 22 | 0.34 | 7.2 |

Table II shows the results of five test runs, E, F, G, H, and I, wherein the temperature varied from 132° to 177° C.

TABLE II.—COPPER +5% SODIUM SILICATE

| Run | Temp., °C. | Furfural feed, parts/hour | Product Analysis | |
|---|---|---|---|---|
| | | | Furfural, percent | Methylfuran, percent |
| E | 132 | 59 | 0.15 | None |
| F | 143 | 59 | 0.44 | 1.2 |
| G | 154 | 68 | 0.45 | 1.6 |
| H | 166 | 57 | 0.51 | 1.2 |
| I | 177 | 59 | 0.76 | 2.8 |

Table III shows the results of seven test runs, J through P, wherein the temperature varied from 110° to 177° C., using a catalyst containing 10% of sodium silicate.

TABLE III.—COPPER + 10% SODIUM SILICATE

| Run | Temp., °C. | Furfural feed, parts/hour | Product Analysis | |
|---|---|---|---|---|
| | | | Furfural, percent | Methylfuran, percent |
| J | 110 | 52 | 10.72 | 0.0 |
| K | 121 | 52 | 0.45 | 0.0 |
| L | 132 | 43 | 0.21 | 0.0 |
| M | 143 | 51 | 0.22 | 0.0 |
| N | 154 | 45 | 0.32 | 0.4 |
| O | 166 | 50 | 0.52 | 1.6 |
| P | 177 | 50 | 0.76 | 2.4 |

Table IV gives the results of five test runs, Q through U, wherein the temperature varied from 132° to 177° C., using a catalyst containing 20% of sodium silicate.

TABLE IV.—COPPER + 20% SODIUM SILICATE

| Run | Temp., °C. | Furfural feed, parts/hour | Product Analysis | |
|---|---|---|---|---|
| | | | Furfural, percent | Methylfuran, percent |
| Q | 132 | 54 | 0.29 | None |
| R | 143 | 65 | 0.13 | None |
| S | 154 | 60 | 0.19 | None |
| T | 166 | 62 | 0.21 | None |
| U | 177 | 62 | 0.31 | None |

The superiority of copper catalysts containing sodium silicate, as compared to copper catalyst without the sodium silicate, is apparent from a study of the above tables, which show that the addition of sodium silicate not only increases the selectivity of the catalyst but also the yield of desired product. The allowable throughput and the temperature range through which the catalyst may be operated are all increased. Figures 1 and 2 are graphical representations of the same data given in Tables I and III respectively.

Referring to the tables and figures, Table I (Figure 1) shows that the best yield of furfuryl alcohol, using merely a copper catalyst, was about 97% through a narrow temperature range. Table III (Figure 2) on the other hand, shows that yields in excess of 99% can be obtained over a wide temperature range with a catalyst containing sodium silicate. This advantage of a catalyst containing sodium silicate is further confirmed by Tables II and IV.

It should also be noticed that as the temperature reached was above 290° F., and using merely a plain copper catalyst (Table I, and Fig. 1), the production of methylfuran rapidly increased, exceeding 6% at about 343° F. On the other hand, and using a catalyst initially containing about 10% of sodium silicate (Fig. 2, Table III) very pure furfuryl alcohol was obtained even at 250° F. and up to over 290° F., while methylfuran formation did not take place in significant amounts until about 310° was reached, but even at 350° F. it did not exceed about 3%.

Finally when 20% of sodium silicate was present in the catalyst base, no methylfuran was produced even at 177° C. (which equals 350.6° F.), and only 0.31% of the original furfural remained unchanged.

This proves conclusively that by the use of a catalyst made with sodium silicate, far superior, and quite unexpected results are obtained.

A selective as compared to a non-selective catalyst is desirable for a number of reasons. When a non-selective catalyst is used in the reduction of furfural, side reactions occur which not only decrease the yield of furfuryl alcohol from a given quantity of furfural, but the furfuryl alcohol produced is excessively contaminated with other products necessitating purification by distillation or other means. A process using a catalyst which is selective and capable of producing high yields of furfuryl alcohol over a wide temperature range is not critical in operation thus making the production of a commercially acceptable product practical.

Having now described and illustrated my invention, I wish it to be understood that my invention is not to be limited to the specific details herein described, except in so far as such limitations are specified in the appended claims.

I claim:

1. A catalyst in the form of discrete pellets particularly adapted to the reduction of furfural to furfuryl alcohol consisting essentially of an intimate mixture of reduced copper and anhydrous sodium silicate, the amount of said silicate constituting between about 5% and 20% by weight of the catalyst.

2. A process of making a catalyst particularly adapted for the quantitative reduction of furfural to furfuryl alcohol which comprises preparing a mixture consisting essentially of copper oxide and an aqueous sodium silicate solution, the amount of said silicate in said mixture constituting between about 5% and 20% on a dry weight basis, forming the mixture into pellets and reducing the pelleted mixture in a gaseous stream containing hydrogen at a temperature between about 150° and 400° C.

3. A process of making a catalyst particularly adapted for the quantitative reduction of furfural to furfuryl alcohol which comprises preparing a mixture consisting essentially of copper oxide and an aqueous sodium silicate solution having an $Na_2O$ to $SiO_2$ ratio of about 1 to 3.22, the amount of said silicate in said mixture constituting between about 5% and 20% on a dry weight basis, drying the mixture and forming it into pellets, and reducing the pelleted mixture in a stream of hydrogen gas at a temperature between about 150° and 400° C.

4. A process of producing relatively pure furfuryl alcohol directly from furfural which comprises passing it in the vapor phase and in the presence of hydrogen at a temperature between about 80° and 200° C. over the catalyst defined in claim 1.

5. A process of producing relatively pure furfuryl alcohol directly from furfural which comprises passing it in the vapor phase and in the presence of a stoichiometric excess of free hydrogen at a temperature of between about 120° and 150° C. over a catalyst prepared in accordance with the process of claim 2.

References Cited in the file of this patent

UNITED STATES PATENTS

| | | |
|---|---|---|
| 1,547,236 | Reyerson | July 28, 1925 |
| 1,739,919 | Ricard et al. | Dec. 17, 1929 |
| 1,782,857 | Millet et al. | Nov. 25, 1930 |
| 1,937,728 | Storch | Dec. 5, 1933 |
| 2,061,470 | Larson | Nov. 17, 1936 |
| 2,077,422 | Lazier | Apr. 20, 1937 |
| 2,082,025 | Peters | June 1, 1937 |
| 2,094,975 | Adkins | Oct. 5, 1937 |
| 2,456,187 | Guinot | Dec. 14, 1948 |

FOREIGN PATENTS

| | | |
|---|---|---|
| 231,458 | Great Britain | June 21, 1926 |
| 255,904 | Great Britain | July 7, 1927 |
| 392,134 | Great Britain | May 11, 1933 |